US012779369B2

(12) United States Patent
Huang et al.

(10) Patent No.: US 12,779,369 B2
(45) Date of Patent: Nov. 3, 2026

(54) VENTING TANK, VENTING TANK ASSEMBLY, COOLING SYSTEM AND MOTOR VEHICLE

(71) Applicant: Illinois Tool Works Inc., Glenview, IL (US)

(72) Inventors: Hui Huang, Shanghai (CN); Zhiming Han, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 265 days.

(21) Appl. No.: 18/789,073

(22) Filed: Jul. 30, 2024

(65) Prior Publication Data

US 2025/0058252 A1 Feb. 20, 2025

(30) Foreign Application Priority Data

Aug. 15, 2023 (CN) ........................ 202311030264.7

(51) Int. Cl.
*B01D 19/00* (2006.01)

(52) U.S. Cl.
CPC ................................ *B01D 19/0042* (2013.01)

(58) Field of Classification Search
CPC .... B01D 19/0042; B01D 19/02; B01D 19/04; F01P 11/0285; F01P 11/028; F01P 11/02; F01P 11/04; F01P 11/16; F01P 11/18; F01P 11/029; B60K 11/02; B60K 11/04; B60K 11/06; B60K 11/08; F28F 9/00; F17D 1/00
See application file for complete search history.

(56) References Cited

U.S. PATENT DOCUMENTS

| | | | | |
|---|---|---|---|---|
| 4,723,596 A * | 2/1988 | Spindelboeck | ........ | F01P 11/029 165/104.32 |
| 5,662,072 A * | 9/1997 | Suzuki | .................. | F01P 11/029 123/41.14 |
| 5,884,588 A * | 3/1999 | Ap | .......................... | F01P 11/20 123/41.14 |
| 7,631,619 B2 * | 12/2009 | Bangert | ................ | F01P 11/029 165/104.32 |

(Continued)

FOREIGN PATENT DOCUMENTS

WO 2017053030 3/2017

*Primary Examiner* — Dung H Bui
(74) *Attorney, Agent, or Firm* — McAndrews, Held & Malloy, Ltd.

(57) ABSTRACT

The present disclosure provides a venting tank, a venting tank assembly, a cooling system having the venting tank and/or the venting tank assembly, and a motor vehicle having the cooling system. The venting tank assembly comprises a venting tank and a fluid connector. The venting tank comprises a tank body having a degassing space, and a connecting pipe having connecting pipe inlet and outlet channels. The fluid connector comprises an inlet section, an outlet section, and a connecting section which enables the inlet and outlets sections to be in fluid communication with the connecting pipe inlet and outlet channels, respectively. The fluid connector forms a bypass flow path communicating the inlet section with the outlet section such that part of a heat transfer fluid from the inlet section is guided into the degassing space, and the rest flows directly to the outlet section via the bypass flow path.

10 Claims, 6 Drawing Sheets

(56) References Cited

U.S. PATENT DOCUMENTS

| | | | | |
|---|---|---|---|---|
| 8,448,696 | B2 * | 5/2013 | Johnston | B60L 58/27 165/917 |
| 11,035,286 | B2 * | 6/2021 | Mark | F01P 7/165 |
| 11,230,962 | B2 * | 1/2022 | Jeong | F01P 11/029 |
| 12,607,143 | B2 * | 4/2026 | Cha | F01P 3/20 |
| 2006/0137663 | A1 * | 6/2006 | Vaught | B01D 19/0042 96/220 |
| 2010/0132817 | A1 * | 6/2010 | Hewkin | B01D 35/027 137/544 |
| 2015/0144079 | A1 * | 5/2015 | Iafrate | B01D 19/00 96/187 |
| 2018/0266306 | A1 * | 9/2018 | Dumas | F01P 11/029 |
| 2023/0082483 | A1 * | 3/2023 | Buvarp | F01P 5/10 220/564 |
| 2024/0159182 | A1 * | 5/2024 | Allan | F01P 11/029 |
| 2025/0019155 | A1 * | 1/2025 | Allan | B60L 58/27 |
| 2025/0058252 | A1 * | 2/2025 | Huang | F01P 11/028 |

* cited by examiner

VENTING TANK, VENTING TANK ASSEMBLY, COOLING SYSTEM AND MOTOR VEHICLE

RELATED APPLICATION

The present application claims the benefit of Chinese Patent Application No. 202311030264.7, filed Aug. 15, 2023, titled "Venting Tank, Venting Tank Assembly, Cooling System and Motor Vehicle," the contents of which are hereby incorporated by reference.

TECHNICAL FIELD

Embodiments of the present disclosure generally relate to a venting tank, a venting tank assembly, a cooling system comprising the venting tank and/or the venting tank assembly, and a motor vehicle comprising the cooling system.

BACKGROUND

A motor vehicle generally has a cooling system for cooling down heat generating component(s) in the motor vehicle. The cooling system comprises a heat transfer fluid circuit and a venting tank (also called an expansion tank or expansion pot). The venting tank is connected, via its inlet pipeline, outlet pipeline and corresponding pipe joints, in the heat transfer fluid circuit to degas a heat transfer fluid.

SUMMARY OF THE DISCLOSURE

The present disclosure relates generally to a venting tank. More specifically, a venting tank for a cooling system of a motor vehicle, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
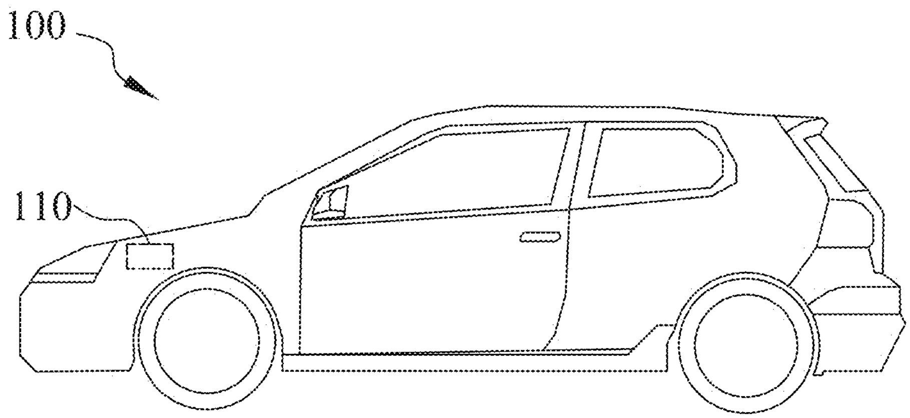
FIG. 1 is a schematic view of a motor vehicle according to an aspect of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein is not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent to or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

According to a first aspect of the present disclosure, the present disclosure provides a venting tank assembly for a cooling system of a motor vehicle, the venting tank assembly comprising a venting tank and a fluid connector. The venting tank comprises a tank body, a connecting pipe, and a connecting pipe separator. The tank body has a degassing space therein. The connecting pipe is connected to the tank body and located outside the tank body. The connecting pipe separator is provided in the connecting pipe and extends along a length direction of the connecting pipe to separate a connecting pipe inlet channel and a connecting pipe outlet channel in the connecting pipe, wherein the connecting pipe inlet channel and the connecting pipe outlet channel are each in fluid communication with the degassing space. The fluid connector comprises an inlet section, an outlet section, and a connecting section. The inlet section is configured for guiding a heat transfer fluid into the venting tank assembly. The outlet section is configured for discharging the heat transfer fluid out of the venting tank assembly. The connecting section is connected to each of the inlet section, the outlet section and the connecting pipe, such that the inlet section is in fluid communication with the connecting pipe inlet channel, and the outlet section is in fluid communication with the connecting pipe outlet channel. The fluid connector is configured to form a bypass flow path communicating the inlet section with the outlet section, and the bypass flow path is separated from the degassing space such that part of the heat transfer fluid flowing in from the inlet section is guided into the degassing space to be degassed, and the rest of the heat transfer fluid flowing in from the inlet section does not pass through the degassing space but flows directly to the outlet section via the bypass flow path.

According to the venting tank assembly in the first aspect described above, the connecting section is substantially tubular, and the inlet section and the outlet section are formed of a straight pipe having a communication opening through its pipe wall, via which the connecting section fluidly communicates with the straight pipe; and the fluid connector further comprises a connector separator substantially extending along an axial direction of the connecting section and comprising a first end and a second end that are opposite one another, wherein the first end is connected to the connecting pipe separator, the second end extends between the inlet section and the outlet section and defines a gap with the pipe wall of the straight pipe, and the gap forms the bypass flow path.

According to the venting tank assembly in the first aspect described above, the connector separator is formed integrally with the inlet section, the outlet section and the connecting section.

According to the venting tank assembly in the first aspect described above, the connecting pipe separator is formed integrally with the connecting pipe.

According to the venting tank assembly in the first aspect described above, an end of the connecting pipe is inserted into the connecting section and provided with a guide part, the connecting section is provided with a guide fitting part, and the guide part is fitted to the guide fitting part such that the connecting pipe is inserted into the connecting section in a predetermined orientation in a direction of rotation about an axis of the connecting pipe.

According to the venting tank assembly in the first aspect described above, the fluid connector further comprises a splitter seal configured to fluidly communicate the inlet section and the outlet section with the connecting pipe inlet channel and the connecting pipe outlet channel respectively in a sealed manner.

According to a second aspect of the present disclosure, the present disclosure provides a venting tank for a cooling system of a motor vehicle, the venting tank comprising a tank body, a connecting pipe, and a connecting pipe separator. The tank body has a degassing space therein. The connecting pipe is connected to the tank body and located outside the tank body. The connecting pipe separator is provided in the connecting pipe and extends along a length direction of the connecting pipe to separate a connecting pipe inlet channel and a connecting pipe outlet channel in the connecting pipe, wherein the connecting pipe inlet channel and the connecting pipe outlet channel are each in fluid communication with the degassing space.

According to the venting tank in the second aspect described above, the venting tank further comprises a flow deflector plate provided in the degassing space and configured such that the heat transfer fluid flowing into the degassing space flows along a path around the flow deflector plate to the connecting pipe outlet channel.

According to the venting tank in the second aspect described above, a bottom of the flow deflector plate is connected to a bottom wall of the tank body, and a top of the flow deflector plate is not lower than the maximum liquid level of the tank body.

According to the venting tank in the second aspect described above, the venting tank further comprises a guide pipe and a guide pipe separator extending along a length direction of the guide pipe and separating an inflow guide channel and a return flow guide channel in the guide pipe, wherein the inflow guide channel fluidly connects the degassing space with the connecting pipe inlet channel, and the return flow guide channel fluidly connects the degassing space with the connecting pipe outlet channel; and the flow deflector plate extends along the length direction of the guide pipe and is connected to the guide pipe separator.

According to the venting tank in the second aspect described above, there are gaps between two ends in a length direction of the flow deflector plate and a side wall of the tank body.

According to the venting tank in the second aspect described above, the connecting pipe, the connecting pipe separator, the flow deflector plate, the guide pipe and the guide pipe separator are integrally formed in one piece.

According to a third aspect of the present disclosure, the present disclosure provides a cooling system, comprising a venting tank assembly according to the first aspect described above and/or a venting tank according to the second aspect described above.

According to a fourth aspect of the present disclosure, the present disclosure provides a motor vehicle, comprising a cooling system according to the third aspect described above.

FIG. 1 shows a schematic view of a motor vehicle 100 according to an aspect of the present disclosure. The motor vehicle 100 comprises a cooling system 110. The cooling system 110 is configured for providing cooling for heat generating component(s) of the motor vehicle 100.

Figure 2:
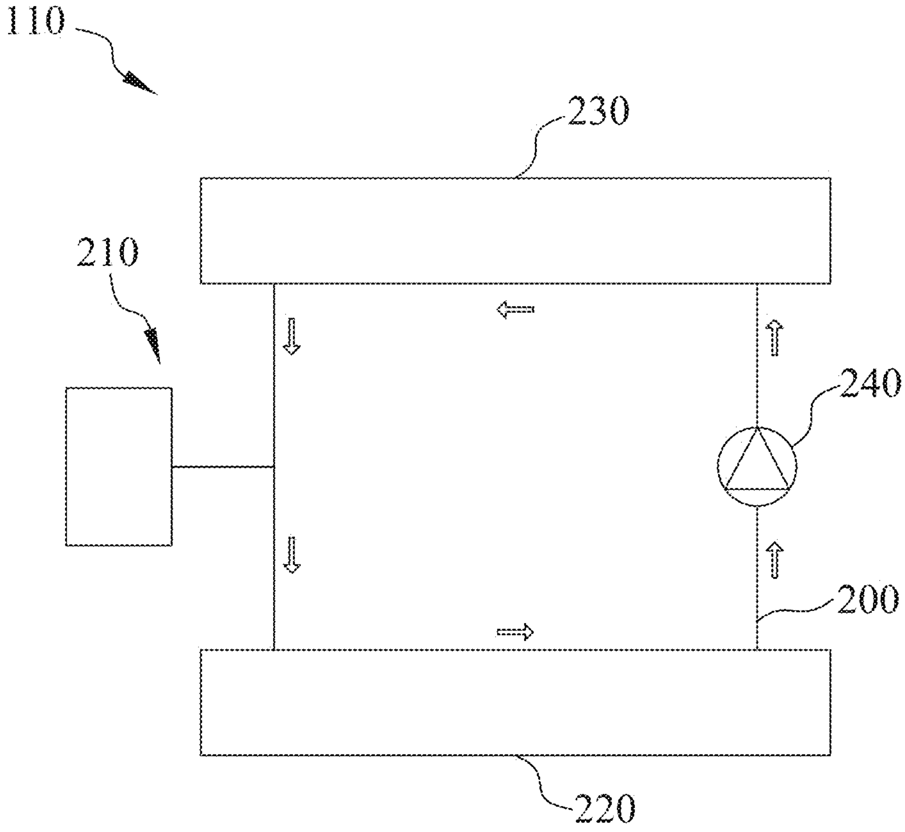
FIG. 2 is a block diagram of a cooling system of the motor vehicle in FIG. 1.

FIG. 2 shows a simplified block diagram of the cooling system 110. As shown in FIG. 2, the cooling system 110 comprises a heat transfer fluid circuit 200, and a venting tank assembly 210, a cooled component 220, a heat exchange device 230 and a pump 240 which are connected in the heat transfer fluid circuit 200. The cooled component 220 is, for example, a battery, an electric motor, or other component(s) of the motor vehicle 100.

A heat transfer fluid (e.g., coolant) in the heat transfer fluid circuit 200 circulates and flows between the heat exchange device 230 and the component 220. The heat transfer fluid absorbs heat emitted by the component 220 when flowing through a cooling passage (not shown) of the cooled component 220, and releases the heat when passing through the heat exchange device 230, so as to cool the component 220 through the circulation and flowing of the heat transfer fluid. The pump 240 is configured for providing power for the circulation and flowing of the heat transfer fluid.

During operation of the cooling system 110, gas is generated from the heat transfer fluid due to heat and other reasons, and excessive gas will affect the normal operation of the cooling system 110. The venting tank assembly 210 is connected in the heat transfer fluid circuit 200 for degassing the heat transfer fluid.

Figure 3A:
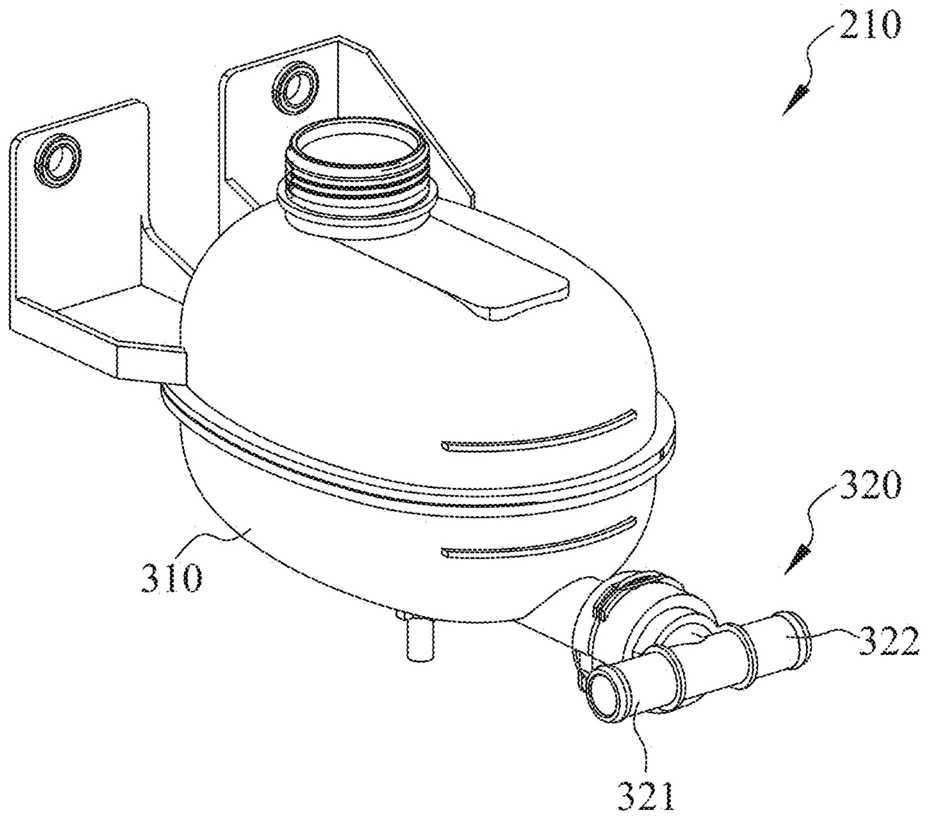
FIG. 3A is a perspective view of a venting tank assembly according to an aspect of the present disclosure.
Figure 3B:
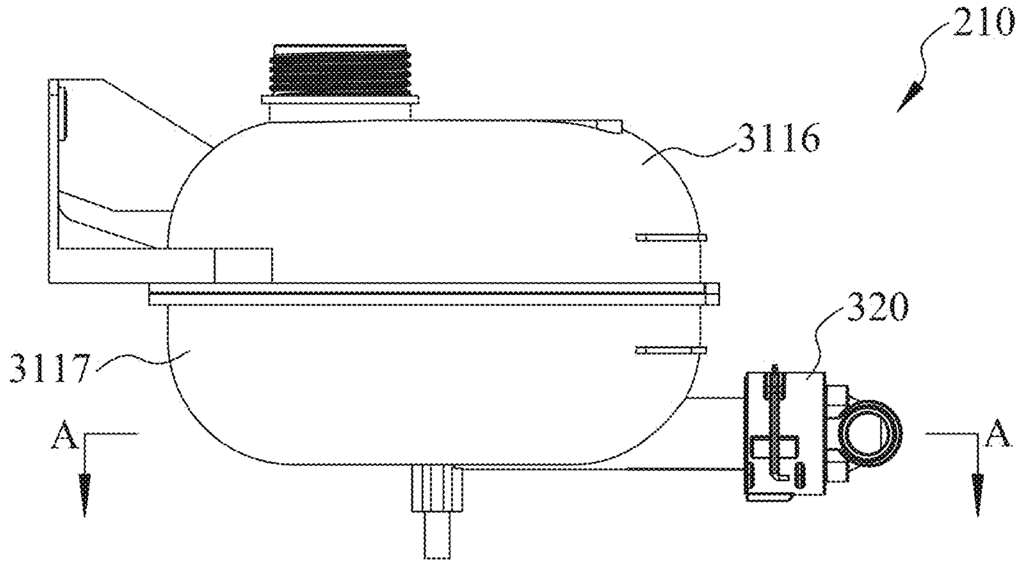
FIG. 3B is a front view of the venting tank assembly in FIG. 3A.
Figure 3C:
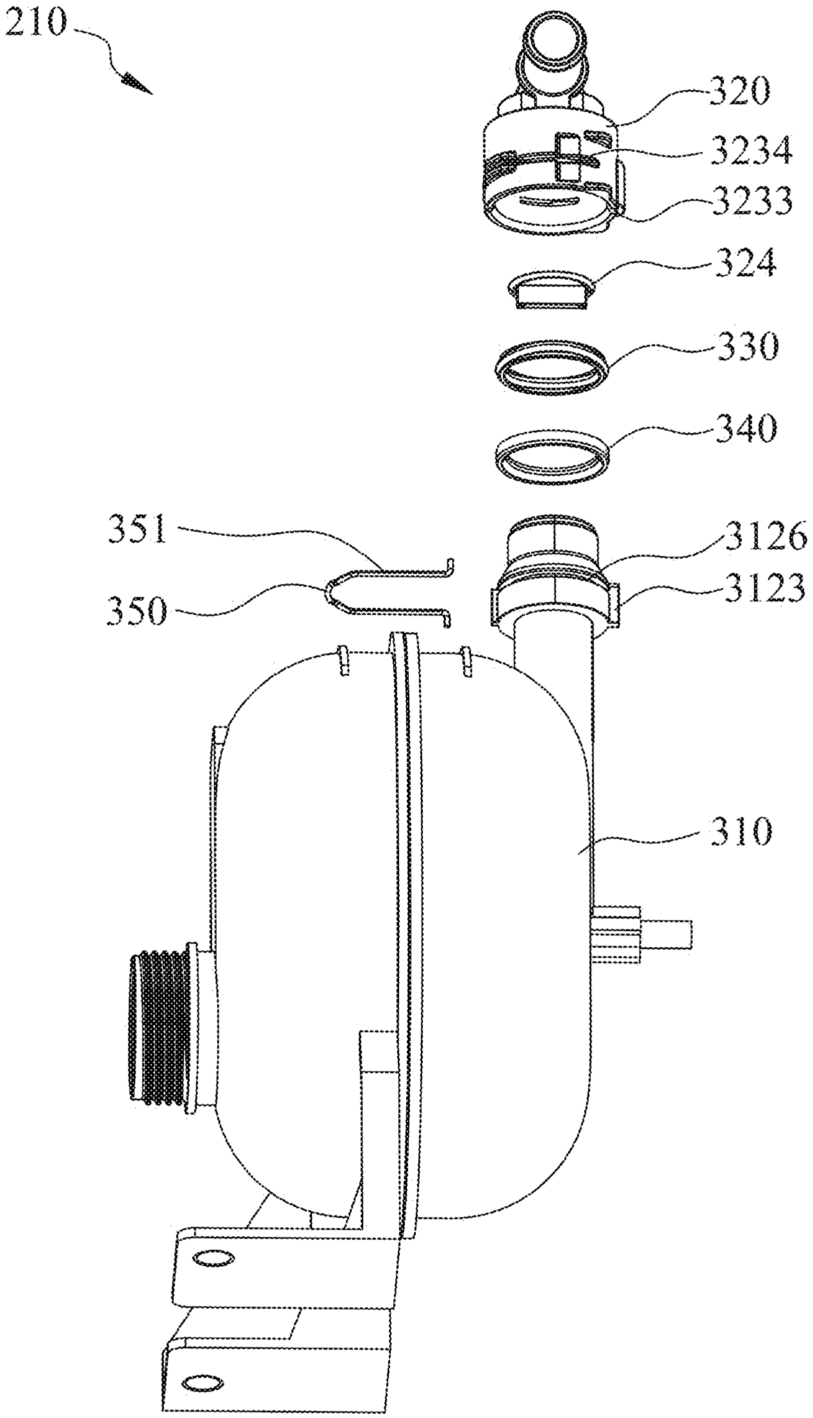
FIG. 3C is an exploded view of the venting tank assembly in FIG. 3A.
Figure 3D:
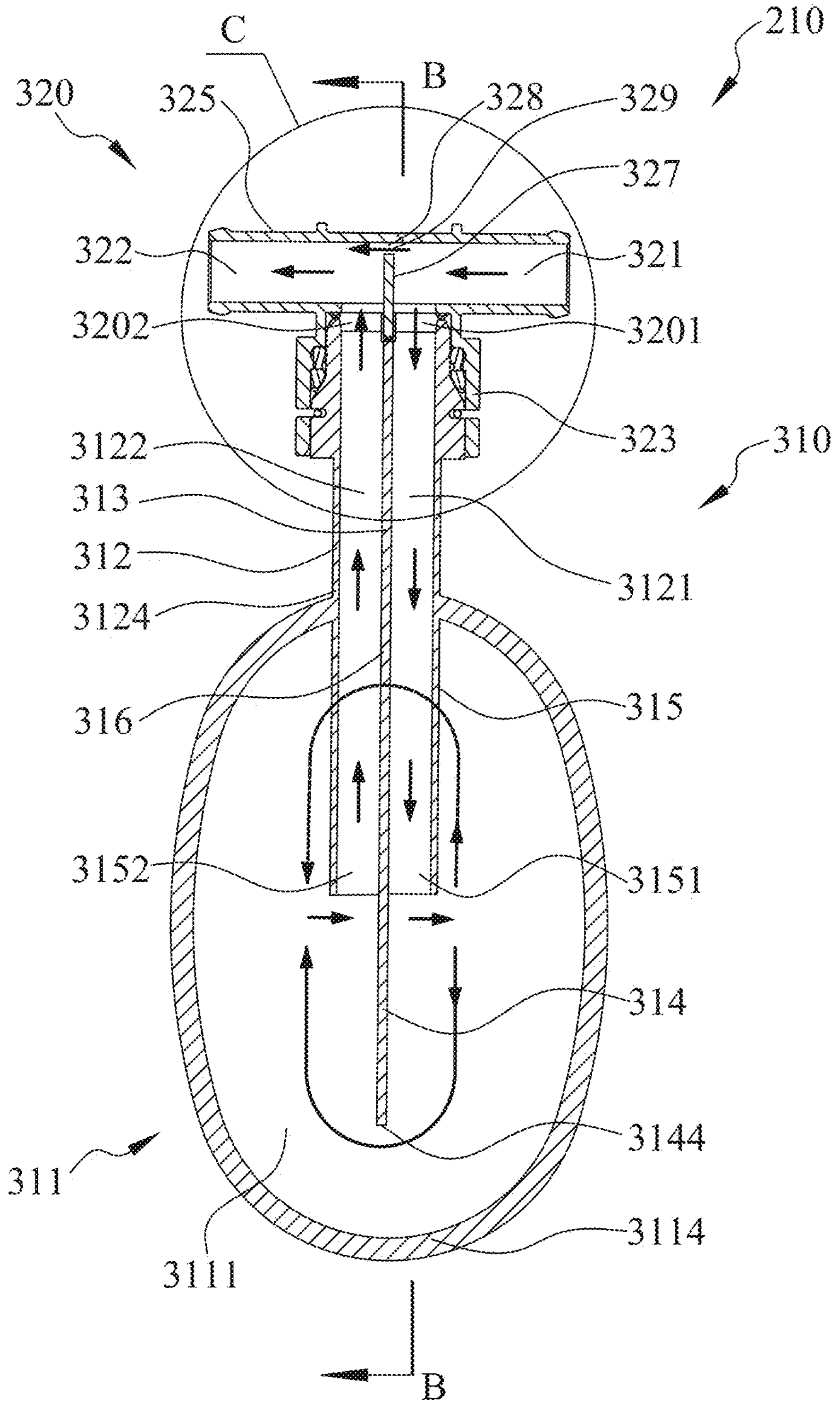
FIG. 3D is a cross-sectional view along line A-A in FIG. 3B.
Figure 3E:
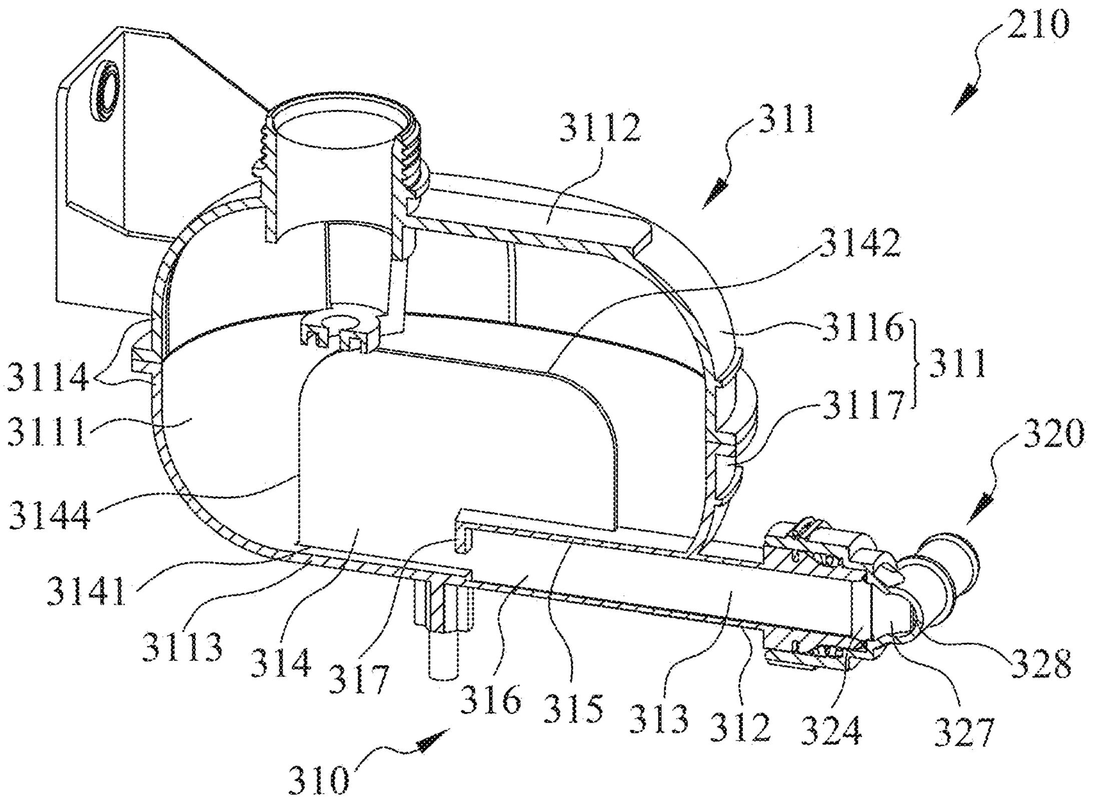
FIG. 3E is a cross-sectional view along line B-B in FIG. 3D.
Figure 3F:
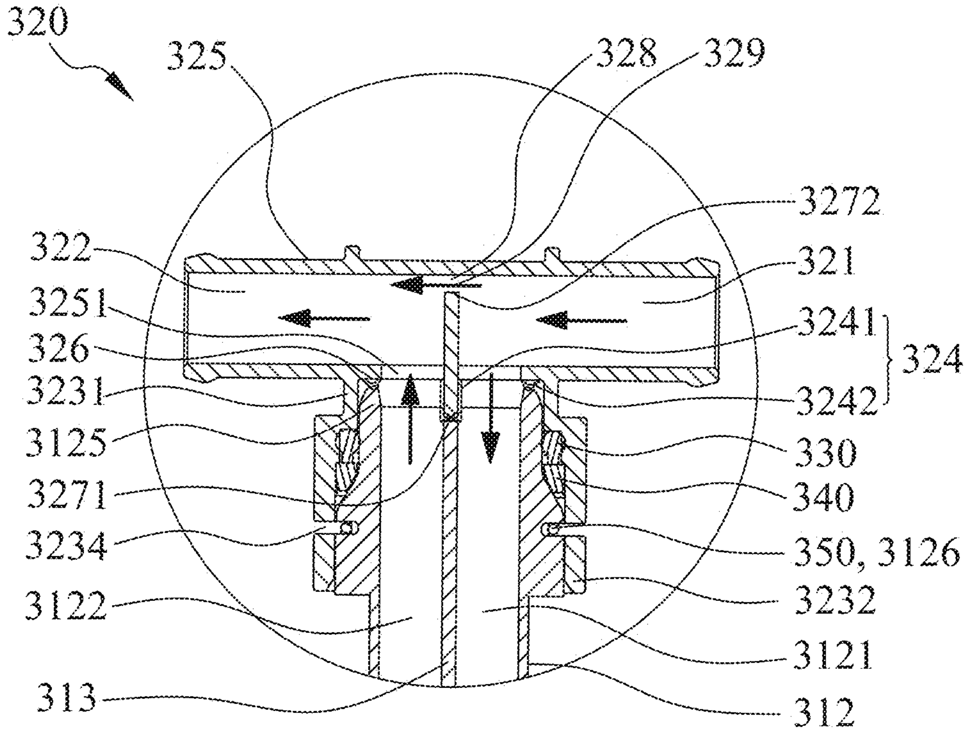
FIG. 3F is a partial enlarged view of part C in FIG. 3D.

FIGS. 3A-3F show the specific structure of the venting tank assembly 210 according to an aspect of the present disclosure. FIG. 3A is a perspective view of the venting tank assembly 210, FIG. 3B is a front view of the venting tank assembly 210, FIG. 3C is an exploded view of the venting tank assembly 210, FIG. 3D is a cross-sectional view along line A-A in FIG. 3B, FIG. 3E is a cross-sectional view along line B-B in FIG. 3D, and FIG. 3F is a partial enlarged view of part C in FIG. 3D.

Referring to FIGS. 3A-3F, the venting tank assembly 210 comprises a venting tank 310, a fluid connector 320, a sealing ring 330, a limiting ring 340, and a latch 350. The venting tank 310 comprises a tank body 311, a connecting pipe 312, a connecting pipe separator 313, a flow deflector plate 314, a guide pipe 315, and a guide pipe separator 316.

The connecting pipe 312 is located outside the tank body 311, and comprises a connecting pipe proximal end 3124 connected to the tank body 311 and a connecting pipe distal end 3125 away from the tank body 311. The connecting pipe distal end 3125 is inserted into the fluid connector 320 and fixedly connected to the fluid connector 320 via the latch 350. The sealing ring 330 is sleeved on the connecting pipe 312 and clamped between the fluid connector 320 and the connecting pipe 312 to connect the fluid connector 320 to the connecting pipe 312 in a sealed manner. The limiting ring 340 is sleeved on the connecting pipe 312 to limit the sealing ring 330.

The connecting pipe separator 313, which is substantially plate-shaped, is provided in the connecting pipe 312 and extends along a length direction of the connecting pipe 312. A width direction of the connecting pipe separator 313 (i.e., the vertical direction according to the orientation shown in FIG. 3E) is along a radial direction of the connecting pipe 312, and opposite sides in the width direction of the connecting pipe separator 313 are each connected to a pipe wall of the connecting pipe 312, so as to separate a connecting pipe inlet channel 3121 and a connecting pipe outlet channel 3122 in the connecting pipe 312.

The fluid connector 320 comprises an inlet section 321, an outlet section 322, a connecting section 323, and a connector separator 327. The inlet section 321 and the outlet section 322 are connected to other pipelines of the heat transfer fluid circuit 200. The inlet section 321 is configured for guiding the heat transfer fluid into the venting tank assembly 210, and the outlet section 322 is configured for discharging the heat transfer fluid out of the venting tank assembly 210. The connecting section 323 is connected to each of the inlet section 321, the outlet section 322 and the connecting pipe 312 respectively, such that the inlet section 321 is in fluid communication with the connecting pipe inlet channel 3121, and the outlet section 322 is in fluid communication with the connecting pipe outlet channel 3122.

Specifically, the inlet section 321, the outlet section 322 and the connecting section 323 are each substantially tubular, and the fluid connector 320 is of a three-way pipe joint structure when viewed from the outside as a whole. The inlet section 321 and the outlet section 322 are formed of a straight pipe 325, two ends of the straight pipe 325 respectively form the inlet section 321 and the outlet section 322, and the straight pipe 325 is substantially perpendicular to the axial direction of the connecting section 323. The straight pipe 325 has a communication opening 3251 passing through its pipe wall. The connecting section 323 comprises a connecting section proximal end 3231 and a connecting section distal end 3232 opposite to each other. The connecting section proximal end 3231 is in fluid communication with the straight pipe 325 via the communication opening 3251, and is thus in fluid communication with the inlet section 321 and the outlet section 322. The connecting pipe 312 is inserted into the connecting section 323 via the connecting section distal end 3232.

The connector separator 327 is substantially plate-shaped and extends along an axial direction of the connecting section 323. The connector separator 327 comprises a first end 3271 and a second end 3272 that are opposite one another in a length direction. The first end 3271 is connected to the connecting pipe separator 313, and the second end 3272 extends between the inlet section 321 and the outlet section 322. A width direction of the connector separator 327 (i.e., the vertical direction according to the orientation shown in FIG. 3E) is along a radial direction of the connecting section 323, and each of two opposite sides in the width direction of the connector separator 327 is connected to a pipe wall of the connecting section 323 and an inner wall of the straight pipe 325, so as to separate a connector inlet channel 3201 and a connector outlet channel 3202 in the fluid connector 320. The connector inlet channel 3201 fluidly connects the inlet section 321 with the connecting pipe inlet channel 3121, and the connector outlet channel 3202 fluidly connects the outlet section 322 with the connecting pipe outlet channel 3122. There is a gap 328 between the connector separator 327 and the pipe wall of the straight pipe 325, and the gap 328 communicates the inlet section 321 with the outlet section 322, so as to form a bypass flow path 329 which will be described in detail below.

The connecting pipe distal end 3125 of the connecting pipe 312 is provided with a guide part 3123, the connecting section distal end 3232 of the connecting section 323 of the fluid connector 320 is provided with a guide fitting part 3233, and the guide part 3123 is fitted to the guide fitting part 3233 such that the connecting pipe 312 is inserted into the connecting section 323 in a predetermined orientation (or direction) in a direction of rotation about an axis of the connecting pipe 312, so that the connector separator 327 is aligned with the connecting pipe separator 313 in a circumferential direction, that is, the two appear to extend continuously, so as to quickly and accurately connect the connecting pipe 312 to the fluid connector 320.

In the illustrated aspect, the guide part 3123 is a protrusion protruding radially outward from an outer peripheral surface of the connecting pipe 312 and extending along the axial direction of the connecting pipe 312, and the guide fitting part 3233 is a groove recessed radially outward from an inner wall of the connecting section 323 and extending along the axial direction of the connecting section 323. Two guide parts 3123 are provided on opposite sides in the radial direction of the connecting pipe 312, and correspondingly, two guide fitting parts 3233 are provided on opposite sides in the radial direction of the connecting section 323.

Two openings 3234 passing through the pipe wall of the connecting section 323 are provided on opposite sides in the radial direction of the connecting section 323, and two engagement grooves 3126 are provided on opposite sides in the radial direction of the connecting pipe 312. Each engagement groove 3126 extends along the circumferential direction of the connecting pipe 312 on an outer wall of the connecting pipe 312 and is connected to the two guide parts 3123. The latch 350 is, for example, a substantially U-shaped resilient clip comprising two substantially parallel legs 351. Each leg 351 passes through one of the openings 3234 of the fluid connector 320 and is engaged in one of the engagement grooves 3126 of the connecting pipe 312.

The connector separator 327 of the fluid connector 320 is formed integrally with the inlet section 321, the outlet section 322 and the connecting section 323, for example, by molding or injection molding, so as to facilitate manufacturing and assembly, and to ensure the sealing of the connecting portions to prevent fluid leakage.

It should be noted that although in the illustrated aspect, the inlet section 321 and the outlet section 322 are formed of the straight pipe 325 substantially perpendicular to the axial direction of the connecting section 323 for ease of design and manufacturing, in some other aspects, the straight pipe 325 may be configured to form a non-90 degree angle with the axial direction of the connecting section 323, or the inlet section 321 and the outlet section 322 may be formed of a bent pipe, or the inlet section 321, the outlet section 322 and the connecting section 323 may be respectively formed of three pipe sections, and the three pipe sections are connected to one another to form a Y shape or other shapes.

Continuing to refer to FIGS. 3A-3F, the venting tank 310 is connected in the heat transfer fluid circuit 200 via the connecting pipe 312 and the fluid connector 320. During operation, the venting tank 310 is designed to be arranged according to the orientation shown in FIGS. 3B and 3E, so that the direction of gravity is basically along the vertical direction in FIGS. 3B and 3E.

The tank body 311 has a degassing space 3111 therein. The degassing space 3111 contains the degassed heat transfer fluid and a gas located above the liquid surface of the heat transfer fluid. The tank body 311 comprises a top wall 3112, a bottom wall 3113, and a side wall 3114. The top wall 3112 is opposite the bottom wall 3113, and the side wall 3114 is connected to the top wall 3112 and the bottom wall 3113. According to the orientation shown in FIG. 3E, the top wall 3112 is located above the degassing space 3111, that is, on the side close to the gas, and the bottom wall 3113 is located below the degassing space 3111, that is, on the side close to the heat transfer fluid. The connecting pipe inlet channel 3121 and the connecting pipe outlet channel 3122 are in fluid communication with the degassing space 3111 to guide the heat transfer fluid to flow into and out of the degassing space 3111, respectively.

In this way, the heat transfer fluid in the heat transfer fluid circuit 200 flows from the inlet section 321 of the fluid connector 320 through the connector inlet channel 3201 and the connecting pipe inlet channel 3121 into the degassing space 3111 in the tank body 311 to be degassed, and the degassed heat transfer fluid flows to the outlet section 322 of the fluid connector 320 through the connecting pipe outlet channel 3122 and the connector outlet channel 3202, and then flows into other pipelines in the heat transfer fluid circuit 200.

The guide pipe 315 is arranged inside the tank body 311, and the guide pipe separator 316 is substantially plate-shaped and extends along a length direction of the guide pipe 315. A width direction of the guide pipe separator 316 (i.e., the vertical direction according to the orientation shown in FIG. 3E) is along a radial direction of the guide pipe 315, and opposite sides in the width direction of the guide pipe separator 316 are respectively connected to a pipe wall of the guide pipe 315, so as to separate an inflow guide channel 3151 and a return flow guide channel 3152 in the guide pipe 315. The inflow guide channel 3151 and the return flow guide channel 3152 are in fluid communication with the degassing space 3111.

The guide pipe 315 has the same inner diameter as the connecting pipe 312 and is coaxially connected to the connecting pipe 312. The guide pipe separator 316 extends along the length direction of the connecting pipe separator 313, and one end in the length direction of the guide pipe separator 316 is connected to one end in the length direction of the connecting pipe separator 313, such that the inflow guide channel 3151 is fluidly connected to the connecting pipe inlet channel 3121, and the return flow guide channel 3152 is fluidly connected to the connecting pipe outlet channel 3122, so as to fluidly connect the degassing space 3111 to the connecting pipe inlet channel 3121 via the inflow guide channel 3151, and to fluidly connect the degassing space 3111 to the connecting pipe outlet channel 3122 via the return flow guide channel 3152.

A lower part of the guide pipe 315 (according to the orientation shown in FIG. 3E) is connected to the bottom wall 3113 of the tank body 311, that is, the bottom wall 3113 of the tank body 311 provides part of the pipe wall of the guide pipe 315, so as to facilitate the gas in the heat transfer fluid to be discharged upwardly by gravity, and to facilitate the degassed heat transfer fluid to be fully discharged from the degassing space 3111.

It should be noted that although in the illustrated aspect, the guide pipe 315 has the same inner diameter as the connecting pipe 312 and is coaxially connected to the connecting pipe 312 for ease of design and manufacturing, in some other aspects, the inner diameters and/or orientations of the guide pipe 315 and the connecting pipe 312 may be different.

Continuing to refer to FIGS. 3A-3F, the flow deflector plate 314 is provided in the degassing space 3111, the bottom 3141 of the flow deflector plate 314 is connected to the bottom wall 3113 of the tank body 311, the top 3142 of the flow deflector plate 314 is not lower than the maximum liquid level in the tank body 311 (i.e., the designed nominal liquid level), and the flow deflector plate 314 extends along the length direction of the guide pipe 315 and is connected to the guide pipe separator 316, so as to force the heat transfer fluid flowing from the inflow guide channel 3151 into the degassing space 3111 to flow to the return flow guide channel 3152 along a relatively long curved path passing around the flow deflector plate 314, to improve the degassing effect on the heat transfer fluid.

There are gaps between opposite ends 3143, 3144 in a length direction of the flow deflector plate 314 and the side wall 3114 of the tank body 311, so that the heat transfer fluid flowing from the inflow guide channel 3151 into the degassing space 3111 flows along two substantially U-shaped paths passing around the two ends 3143, 3144 of the flow deflector plate 314, and then flows into the return flow guide channel 3152. The U-shaped flow path of the heat transfer fluid is schematically shown by arrows in FIG. 3D. It should be noted that since the lower part of the guide pipe 315 is connected to the bottom wall 3113 of the tank body 311, the heat transfer fluid only flows along the U-shaped path shown by the solid line in FIG. 3D at a level not higher than the guide pipe 315, whereas the heat transfer fluid flows along both the U-shaped path shown by the solid line in FIG. 3D and the U-shaped path shown by the dotted line in FIG. 3D at a level above the guide pipe 315.

It should be noted that, although in the illustrated aspect, there are the gaps between the opposite ends 3143, 3144 in the length direction of the flow deflector plate 314 and the side wall 3114 of the tank body 311, in some other aspects, it is possible that there is a gap between only one of the two ends 3143, 3144 of the flow deflector plate 314 and the side wall 3114 of the tank body 311. In addition, although in the illustrated aspect, the flow deflector plate 314 is configured as a flat plate extending along the length direction of the guide pipe 315 for ease of manufacturing, in some other aspects, the flow deflector plate 314 may be configured to extend in other directions and/or be configured in other shapes.

Continuing to refer to FIGS. 3A-3F, the tank body 311 is of a split structure, comprising an upper tank body 3116 and a lower tank body 3117. The upper tank body 3116 and the lower tank body 3117 respectively define an upper half and a lower half of the degassing space 3111 (according to the orientation shown in FIG. 3E). The connecting pipe 312, the connecting pipe separator 313, the flow deflector plate 314, the guide pipe 315, and the guide pipe separator 316 are formed integrally with the lower tank body 3117, for example, by molding or injection molding, so as to facilitate manufacturing and assembly, and to ensure the sealing of the connecting portions to prevent fluid leakage.

As can be seen from the above, in order to fully degas the heat transfer fluid in the degassing space 3111, the flow path for guiding the heat transfer fluid to degas is set to be relatively long. If the entire flow of the heat transfer fluid flowing into the venting tank assembly 210 from the inlet section 321 passes through the degassing space 3111 via the flow path to be degassed, a large pressure drop will occur in the heat transfer fluid circuit. In order to ensure that the circulation pressure of the heat transfer fluid circuit meets requirements, the venting tank assembly 210 forms the aforementioned bypass flow path 329 communicating the inlet section 321 with the outlet section 322 in the fluid connector 320, and the bypass flow path 329 is separated from the degassing space 3111 such that part of the heat transfer fluid flowing in from the inlet section 321 is guided into the degassing space 3111, and flows into the outlet section 322 after being degassed in the degassing space 3111, while the rest of the heat transfer fluid flowing in from the inlet section 321 does not pass through the degassing space 3111 but flows directly to the outlet section 322 via the bypass flow path 329. By designing the size of the gap 328 between the connector separator 327 and the straight pipe 325, a flow of the heat transfer fluid flowing into the degassing space 3111 can be conveniently and accurately controlled, and the structure is simple, and is easy to design and manufacture.

As an optional configuration, the venting tank 310 further comprises a flow limiting structure 317 provided in the inflow guide channel 3151 to further limit the flow of the heat transfer fluid flowing into the degassing space 3111. Specifically, the flow limiting structure 317 is a stop block formed integrally with the guide pipe 315, and is arranged at one end of the inflow guide channel 3151 away from the connecting pipe 312 to block part of the cross-section of the inflow guide channel 3151. In this way, by designing the size of the flow limiting structure 317, the flow of the heat transfer fluid flowing into the degassing space 3111 can be conveniently and accurately controlled, and the structure is simple, and is easy to design and manufacture.

Thus, by selecting one venting tank 310 from a plurality of venting tanks 310 having flow limiting structures 317 of different sizes and/or by selecting one fluid connector 320 from a plurality of fluid connectors 320 having gaps 328 of different sizes to form the venting tank assembly 210, multiple proportional relationships between the flow of the bypass flow path 329 and the flow of the degassing flow path passing through the degassing space 3111 can be conveniently obtained to meet the requirements of various application environments.

Optionally, the gap 328 between the connector separator 327 and the straight pipe 325 and/or the flow limiting structure 317 is sized such that 10% to 40% of the total flow of the heat transfer fluid flowing in from the inlet section 321 of the fluid connector 320 enters the degassing space 3111 to be degassed, and the remaining flow bypasses the degassing space 3111 via the bypass flow path 329.

As an optional configuration, the fluid connector 320 further comprises a splitter seal 324. The splitter seal 324 fluidly communicates the inlet section 321 and the outlet section 322 respectively with the connecting pipe inlet channel 3121 and the connecting pipe outlet channel 3122 in a sealed manner, so as to more accurately control the proportional relationship between the flow of the bypass flow path 329 and the flow of the degassing flow path.

Figure 4A:
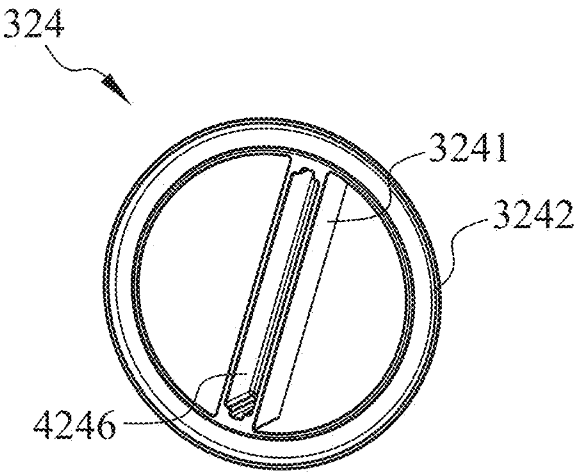
FIG. 4A is a perspective view of a splitter seal of the venting tank assembly in FIG. 3A as viewed from front to back.
Figure 4C:
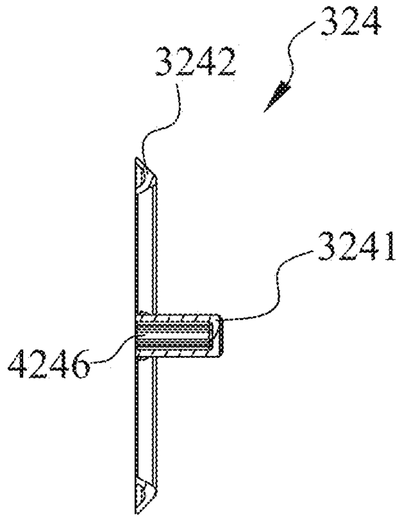
FIG. 4C is a radial cross-sectional view of the splitter seal in FIG. 3A.
Figure 4B:
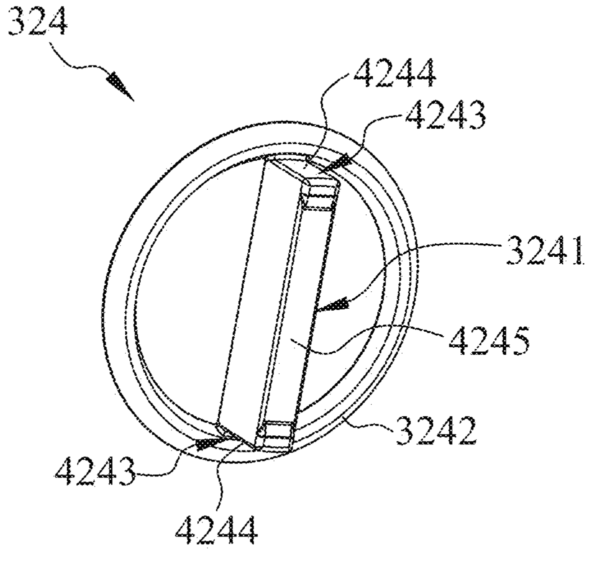
FIG. 4B is a perspective view of the splitter seal in FIG. 3A as viewed from back to front.

FIGS. 4A-4C show the specific structure of the splitter seal 324. FIG. 4A is a perspective view of the splitter seal 324 as viewed from front to back, FIG. 4B is a perspective view of the splitter seal 324 as viewed from back to front, and FIG. 4C is a radial cross-sectional view of the splitter seal 324.

Referring to FIGS. 4A-4C, the splitter seal 324 comprises a radial sealing portion 3241 and a circumferential sealing portion 3242. The circumferential sealing portion 3242 is arranged around the radial sealing portion 3241, and the radial sealing portion 3241 is connected, via its opposite ends 4243 in the length direction, to the circumferential sealing portion 3242. The axial length of the radial sealing portion 3241 is greater than the axial length of the circumferential sealing portion 3242. The radial sealing portion 3241 comprises end sealing surfaces 4244 located at its opposite ends 4243 and extending axially, and a radial sealing surface 4245 connecting the end sealing surfaces 4244 to each other. The radial sealing surface 4245 extends radially and is located on a side of the radial sealing portion 3241 away from the circumferential sealing portion 3242.

The radial sealing portion 3241 forms an inner cavity 4246 for receiving the first end 3271 of the connector separator 327, and an opening of the cavity 4246 is located on a side of the radial sealing portion 3241 close to the circumferential sealing portion 3242. The splitter seal 324 is made of an resilient material, for example, integrally formed in one piece from a rubber material. The cavity 4246 is sized to be slightly smaller than the size of the first end 3271 of the connector separator 327, such that the radial sealing portion 3241 can be wrapped around the connector separator 327 to retain the splitter seal 324 in the fluid connector 320 by means of the connector separator 327.

Referring to FIGS. 3A-3F, the inner diameter of the connecting section proximal end 3231 of the fluid connector 320 is larger than the size of the communication opening 3251, thereby forming a stepped surface 326 between the communication opening 3251 and the connecting section proximal end 3231. The first end 3271 of the connector separator 327 extends from the communication opening 3251 of the straight pipe 325 beyond the stepped surface 326 and into the connecting section 323. The end of the connecting pipe separator 313 close to the connecting pipe distal end 3125 is retracted toward the inside of the connecting pipe 312 relative to an end surface of the connecting pipe distal end 3125. When the fluid connector 320 receives and is fixedly connected to the connecting pipe 312, the connecting pipe 312 is located in the connecting section 323 of the fluid connector 320, and the first end 3271 of the connector separator 327 and the radial sealing portion 3241 of the splitter seal 324 retained thereon at least partially extend into the connecting pipe 312. The radial sealing portion 3241 of the splitter seal 324 is clamped between the connector separator 327 and the connecting pipe separator 313, and the radial sealing surface 4245 of the radial sealing portion abuts against the connecting pipe separator 313. In addition, the two end sealing surfaces 4244 of the radial sealing portion 3241 abut against an inner surface of the connecting pipe 312. The circumferential sealing portion 3242 of the splitter seal 324 is clamped between the end surface of the connecting pipe distal end 3125 and the stepped surface 326 of the fluid connector 320.

In this way, the circumferential sealing portion 3242 of the splitter seal 324 communicates the connecting pipe 312 with the communication opening 3251 in a sealed manner, and the radial sealing portion 3241 of the splitter seal 324 connects the connecting pipe separator 313 to the connector separator 327 in a sealed manner, to communicate the inlet section 321 of the fluid connector 320 with the connecting pipe inlet channel 3121 in a sealed manner, and communicate the outlet section 322 of the fluid connector 320 with the connecting pipe outlet channel 3122 in a sealed manner, so as to more accurately control the proportional relationship between the flow of the bypass flow path 329 and the flow of the degassing flow path.

It should be noted that although in the illustrated aspect, the connector separator 327 is connected to the connecting pipe separator 313 via the splitter seal 324, in some other aspects, no connector separator 327 may be provided, or the connector separator 327 may be provided by the connecting pipe separator 313, provided that the proportional relationship between the flow of the bypass flow path 329 and the flow of the degassing flow path can meet the requirements. For example, the connecting pipe 312 is inserted between the inlet section 321 and the outlet section 323 of the fluid connector 320, and there is a gap between each of the connecting pipe distal end 3125 and the connecting pipe separator 313, and the pipe wall of the straight pipe 325, so that the inlet section 321 is in communication with the outlet section 323 to form a bypass flow path. Further, part of the pipe wall of the connecting pipe 312 facing the inlet section 321 and part of the pipe wall facing the outlet section 323 may be cut off, so as to facilitate the flowing of the heat transfer fluid from the inlet section 321 into the connecting pipe 312 and from the connecting pipe 312 into the outlet section 323.

According to the venting tank assembly of the aspects of the present disclosure, by separating the connecting pipe inlet channel and the connecting pipe outlet channel in the connecting pipe, and by separating the connector inlet channel and the connector outlet channel in the fluid connector, only one connecting pipe and one fluid connector are needed to connect the venting tank in the heat transfer fluid circuit. Compared with a conventional solution of connecting the venting tank in the heat transfer fluid circuit by means of two separate pipelines, namely an inlet pipeline and an outlet pipeline, and the corresponding pipe joints, the present disclosure can save space, reduce the number of parts (such as pipelines, pipe joints, pipe clamps, etc.), facilitate manufacturing and installation, and can reduce costs. In addition, according to the venting tank assembly of the aspects of the present disclosure, the connector separator of the fluid connector for separating the two channels and the straight pipe for forming the inlet section and the outlet section are used to form the bypass flow path, so that there is no need to add an additional bypass pipeline structure, which can further simplify the structure and save space, reduce the number of parts, facilitate design and manufacturing, and reduce assembly steps.

Although the present disclosure is described with reference to the examples of aspects outlined above, various alternatives, modifications, variations, improvements and/or substantial equivalents, which are known or anticipated at present or to be anticipated before long, may be obvious to those of at least ordinary skill in the art. In addition, the technical effects and/or technical problems described in this specification are exemplary rather than limiting; Therefore, the disclosure in this specification may be used to solve other technical problems and have other technical effects and/or may solve other technical problems. Accordingly, the examples of the aspects of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements and/or substantial equivalents.

What is claimed is:

1. A motor vehicle, comprising a cooling system; wherein the cooling system, comprising a venting tank assembly for a cooling system of a motor vehicle, the venting tank assembly comprising: a venting tank comprising a tank body having a degassing space therein; a connecting pipe connected to the tank body and located outside the tank body; and a connecting pipe separator provided in the connecting pipe and extending along a length direction of the connecting pipe to separate a connecting pipe inlet channel and a connecting pipe outlet channel in the connecting pipe, wherein the connecting pipe inlet channel and the connecting pipe outlet channel are each in fluid communication with the degassing space; and a fluid connector comprising an inlet section for guiding a heat transfer fluid into the venting tank assembly; an outlet section for discharging the heat transfer fluid out of the venting tank assembly; and a connecting section connected to each of the inlet section, the outlet section and the connecting pipe, such that the inlet section is in fluid communication with the connecting pipe inlet channel, and the outlet section is in fluid communication with the connecting pipe outlet channel; wherein the fluid connector is configured to form a bypass flow path communicating the inlet section with the outlet section, and the bypass flow path is separated from the degassing space such that part of the heat transfer fluid flowing in from the inlet section is guided into the degassing space to be degassed, and the rest of the heat transfer fluid flowing in from the inlet section does not pass through the degassing space but flows directly to the outlet section via the bypass flow path.

2. The motor vehicle according to claim 1, wherein the connecting section is tubular, and the inlet section and the outlet section are formed of a straight pipe having a communication opening through its pipe wall, via which the connecting section fluidly communicates with the straight pipe; and wherein the fluid connector further comprises a connector separator extending along an axial direction of the connecting section and comprising a first end and a second end that are opposite one another, wherein the first end is connected to the connecting pipe separator, the second end extends between the inlet section and the outlet section and defines a gap with the pipe wall of the straight pipe, and the gap forms the bypass flow path.

3. The motor vehicle according to claim 2, wherein the connector separator is formed integrally with the inlet section, the outlet section and the connecting section.

4. The motor vehicle according to claim 1, wherein the connecting pipe separator is formed integrally with the connecting pipe.

5. The motor vehicle according to claim 1, wherein an end of the connecting pipe is inserted into the connecting section and provided with a guide part, the connecting section is provided with a guide fitting part, and the guide part is fitted to the guide fitting part such that the connecting pipe is inserted into the connecting section in a predetermined orientation in a direction of rotation about an axis of the connecting pipe.

6. The motor vehicle according to claim 1, wherein the fluid connector further comprises a splitter seal configured to fluidly communicate the inlet section and the outlet section with the connecting pipe inlet channel and the connecting pipe outlet channel respectively in a sealed manner.

7. A venting tank for a cooling system of a motor vehicle, the venting tank comprising: a tank body having a degassing space therein; a connecting pipe connected to the tank body and located outside the tank body; and a connecting pipe separator provided in the connecting pipe and extending along a length direction of the connecting pipe to separate a connecting pipe inlet channel and a connecting pipe outlet channel in the connecting pipe, wherein the connecting pipe inlet channel and the connecting pipe outlet channel are each in fluid communication with the degassing space; wherein the venting tank further comprises a flow deflector plate provided in the degassing space and configured such that the heat transfer fluid flowing into the degassing space flows along a path around the flow deflector plate to the connecting pipe outlet channel; wherein the venting tank further comprises a guide pipe and a guide pipe separator extending along a length direction of the guide pipe and separating an inflow guide channel and a return flow guide channel in the guide pipe, wherein the inflow guide channel fluidly connects the degassing space with the connecting pipe inlet channel, and the return flow guide channel fluidly connects the degassing space with the connecting pipe outlet channel; and wherein the flow deflector plate extends along the length direction of the guide pipe and is connected to the guide pipe separator; and wherein there are gaps between its two ends in a length direction of the flow deflector plate and a side wall of the tank body.

8. The venting tank according to claim 7, wherein a bottom of the flow deflector plate is connected to a bottom wall of the tank body, and a top of the flow deflector plate is not lower than the maximum liquid level of the tank body.

9. The venting tank according to claim 7, wherein the connecting pipe, the connecting pipe separator, the flow deflector plate, the guide pipe and the guide pipe separator are integrally formed in one piece.

10. A cooling system, comprising a venting tank according to claim 7.

* * * * *